United States Patent

Albertson

[15] 3,698,499
[45] Oct. 17, 1972

[54] ALL TERRAIN VEHICLE STABILIZING WHEELS

[72] Inventor: Robert V. Albertson, 2100 Shady Wood Road, Minneapolis, Minn.

[22] Filed: May 13, 1970

[21] Appl. No.: 36,775

[52] U.S. Cl................180/6.2, 180/9.32, 280/81 R
[51] Int. Cl. ...........................................B62d 61/10
[58] Field of Search............180/6.48, 6.2, 9.34, 9.36, 180/9.38, 22, 9.32; 280/81 R, 43.23, 150 A, 104.5 A, 5.2

[56] References Cited

UNITED STATES PATENTS 3,180,305  4/1965  Gower-Rempel.....180/6.48 X
3,191,963  6/1965  Prichard.............280/43.23 X

FOREIGN PATENTS OR APPLICATIONS 738,018  12/1932  France.....................280/5.2

Primary Examiner—Benjamin Hersh
Assistant Examiner—John A. Pekar
Attorney—Alfred E. Hall

[57] ABSTRACT

An all terrain vehicle having an additional pair of wheels extending outwardly from the front or the back of the vehicle a predetermined distance and shock absorbing means urging the additional pair of wheels downwardly toward the ground on which the vehicle is riding such that the tendency for the vehicle to pitch forward when passing over rough terrain is reduced.

2 Claims, 3 Drawing Figures

PATENTED OCT 17 1972 3,698,499

INVENTOR
ROBERT V. ALBERTSON

BY  Alfred E. Hall
ATTORNEY

ALL TERRAIN VEHICLE STABILIZING WHEELS

BACKGROUND OF THE INVENTION

Recently a number of manufacturing companies have introduced in the market a wheeled vehicle referred to generically as an "all terrain vehicle." The vehicle is designed to be amphibious and commonly comprises a molded plastic body having an upper and lower shell sealed together to define a hollow chamber for flotation purposes. The body is generally supported by three axles, the first and second being located in close proximity to the front and rear ends of the body and the third being located midway between. Mounted on each axle is a pair of wheels having relatively wide, low pressure pneumatic tires mounted thereon. A motor and suitable transmission couple the driving force to the wheels. The transmission is such that the wheels on one side of the body are driven in unison with each other but are separately controllable in speed from the set of wheels on the other side. The tires generally have high ribs extending outwardly therefrom and these ribs serve as paddles when the vehicle is operated in water.

The construction of the vehicle is such that there is a tendency for the vehicle to pitch forward when it passes over a sharp ridge or hill. This is due to the fact that upon climbing the ridge and reaching the crown the vehicle will reach a point where it is supported by the central and rearmost set of wheels whereas the front wheels will be off of the ground. As the vehicle proceeds, it will overbalance and the front end will tend to slam down thereby jostling the operator and passenger.

SUMMARY OF THE INVENTION

The present invention provides an improvement whereby this undesirable effect is reduced or eliminated. Specifically, I have provided an additional set of wheels which extend outwardly from the front end of the vehicle on either a single axle or individual axles but I prefer individual axles. The axles for this additional set of wheels are pivotally mounted such that this set of wheels is free to move upward and downward about the pivot point. Further, I have coupled these axles to the body by means of a shock absorbing device which normally urges the additional set of wheels toward the ground. As the vehicle now passes over the crown of a hill or ridge, the additional pair of wheels make contact with the ground and the shock absorbing means dissipates the force of the impact which would otherwise be present. I also anticipate providing an additional set of wheels operating in a similar manner but extending from the rear of the vehicle.

It is accordingly an object of the present invention to provide an arrangement for an all terrain vehicle which reduces the shock to the passengers when passing over rugged terrain.

Another object of the invention is to provide an improvement for all terrain vehicle comprising an additional set of wheels operatively coupled to the vehicle body by shock absorbing means such that the tendency for the vehicle to pitch when passing over a hill or ridge is reduced.

BRIEF DESCRIPTION OF THE DRAWINGS

These and other objects of the invention will become more apparent as the preferred embodiment is described with the aid of the accompany drawings in which.

DESCRIPTION OF THE PREFERRED EMBODIMENT

Figure 1:
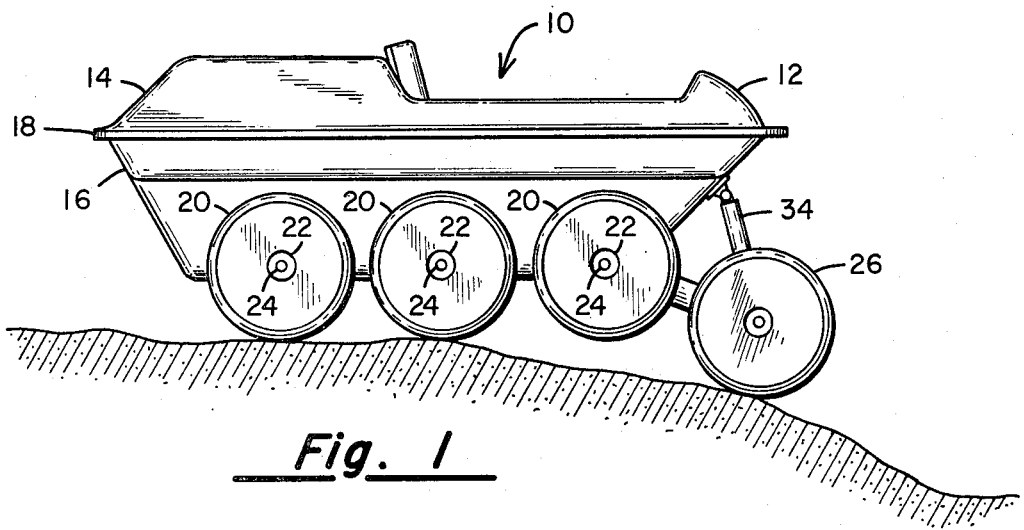
FIG. 1 is a side elevation of all terrain vehicle incorporating the present invention.

Referring first to FIG. 1, there is shown an all terrain vehicle 10 having a body 12 which may be reinforced molded fiber-glass or other suitable material. The body is formed from two shells 14 and 16 which are bonded together along a seam 18 to define a hollow chamber. This chamber permits the vehicle to float on water.

The body is supported by a plurality of wheels 20 having, for example, 11 inches × 20 inches soft, low pressure pneumatic tires thereon. The air in the tires may be at a pressure of 1½ to 2½ pounds per square inch and because the tires are formed from a soft highly flexible material, they flex to cover the contour of uneven terrain, producing constant traction. Hence, they act much like a tank tread. The ribs 22 on the tires act like paddle wheels when the vehicle is operated in water.

The tires 20 are bonded to a hub 22 which, in turn, are connected to an axle 24. The axles pass through seals (not shown) in the lower shell 16 of the body 12 and are connected to a motor driven transmission such that the wheels on each side of the vehicle are driven in unison, but separately controllable in speed from the wheels on the other side. Turning is accomplished by stopping the wheels on one side while driving those on the opposite side. Because the drive mechanism is not pertinent to the present invention, this structure is not illustrated.

The soft, low pressure tires on the vehicle provide a certain degree of cushioning and have a shock absorbing effect to yield a relatively smooth ride over rough terrain. However, the tendency for the vehicle to pitch forward as it passes over the crown of a hill or ridge may cause discomfort for the passengers. The pitching of the vehicle results from the fact that as the vehicle passes over a ridge the body may be momentarily supported by the center and rear wheels and the front wheels will be off the ground. As the vehicle proceeds, however, it overbalances and the front end slams down, throwing the occupants forward. To obviate this problem, I have provided an additional pair of wheels 26 and 28, which may be identical in construction to the other wheels on the vehicle. The axles for the wheels 26 and 28 are journaled in a pair of arms 32 which are pivotally mounted with respect to the axle 24 of the front set of wheels. These arms are of a length which allows the wheels 26 and 28 to extend outwardly from the front end of the vehicle a predetermined distance.

Figure 2:
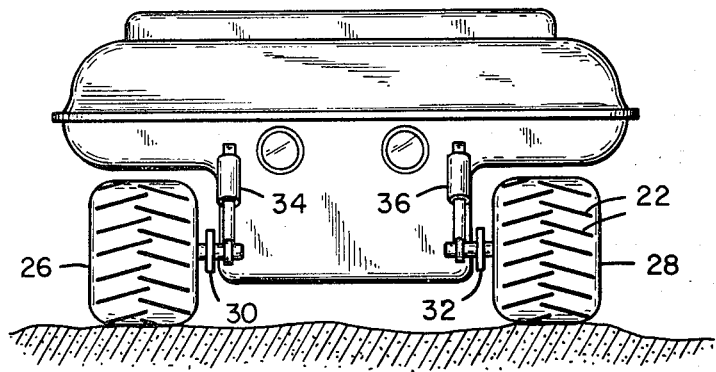
FIG. 2 is a front view of the vehicle of FIG. 1.
Figure 3:
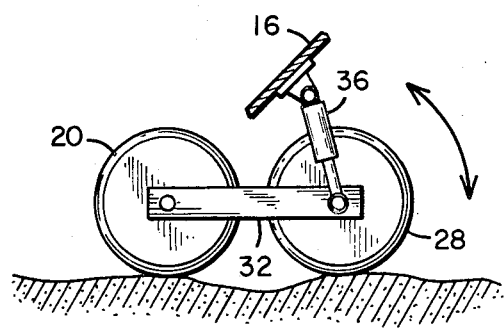
FIG. 3 is a partial cross-section view showing an arrangement for adapting the present invention to a conventional all terrain vehicle.

A pair of shock absorbers 34 and 36 are affixed at one end to the lower shell of the body 16 (FIG. 2 and FIG. 3) and at the other end to the axles of wheels 26 and 28. The weight of the wheels 26 and 28 and the construction of the shock absorbers normally urge the arms 30 and 32 to rotate in a clockwise direction toward the ground. Hence, as the vehicle passes over a ridge the wheels 26 and 28 move downward to contact the ground as shown in FIG. 1 and after a short but predetermined time the shock absorbers telescope to more gently bring the front wheels of the vehicle into contact with the ground. As is the usual case, this shock absorber freely allows motion in one direction but restricts motion in the opposite direction. Thus, the tendency for the vehicle to pitch forward and jostle the occupants is reduced.

While I have illustrated one mode of construction deemed by me to be the preferred embodiment of my invention, it should be apparent that persons skilled in the art may conceive of variations of the invention not specifically described herein. Hence, the invention should only be limited by the scope of the appended claims

What is claimed is:

1. In an all terrain vehicle of the type having a molded hollow body, first and second axles located in proximity to the front and rear ends of said body and a third axle located midway between said front and rear ends, wheels having low pressure pneumatic tires thereon mounted on said first, second and third axles, motor means, and transmission means for coupling said motor means individually to the wheels on opposite sides of said body, the improvement comprising:

a. a fourth axle having wheels thereon, said axle being pivotally mounted with respect to said body and extending outwardly along the longitudinal axis a predetermined distance from said body and b. shock absorbing means for freely allowing motion in one direction but restricting motion in the opposite direction affixed to said fourth axle and to said body for urging said wheels on said fourth axle downwardly against the ground surface on which the vehicle is operating.

2. In an all terrain vehicle of the type including a molded hollow body, a pair of axles located in proximity to the front and rear ends of said body and a third axle located midway between said front and rear ends, three pairs of wheels having low pressure pneumatic tires, a pair of said wheels mounted on each of said axles, a motor and drive means coupled to drive the wheels on either side of said body in unison, the improvement comprising:

a. a pair of arms each having a first end pivotally mounted with respect to said body;

b. means for mounting an additional pair of said wheels on the other end of said pair of arms, the arms being of a length such that said additional pair of wheels extend outwardly from said front end of said body; and c. shock absorber means coupled between said pair of arms and said body for urging said additional pair of wheels against the ground surface on which the vehicle is operating.

* * * * *